(12) United States Patent
Kim

(10) Patent No.: US 11,180,061 B2
(45) Date of Patent: Nov. 23, 2021

(54) SYSTEM AND METHOD FOR CONTROLLING AIR VENTILATION VOLUME OF VEHICLE SEAT

(71) Applicants: Hyundai Motor Company, Seoul (KR); Kia Motors Corporation, Seoul (KR)

(72) Inventor: Hyang Mi Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/927,484

(22) Filed: Jul. 13, 2020

(65) Prior Publication Data

US 2021/0268946 A1 Sep. 2, 2021

(30) Foreign Application Priority Data

Feb. 28, 2020 (KR) .................. 10-2020-0024714

(51) Int. Cl.
*B60N 2/56* (2006.01)
*B60N 2/00* (2006.01)

(52) U.S. Cl.
CPC .......... *B60N 2/5657* (2013.01); *B60N 2/002* (2013.01)

(58) Field of Classification Search
CPC .......... B60N 2/5657; B60N 2/56; B60N 2/90; B60N 2/002; B60H 1/00478; B60H 1/00742; B60H 1/5657; B60H 1/5678

USPC ....................................................... 297/217.2
See application file for complete search history.

(56) References Cited

U.S. PATENT DOCUMENTS

| | | | |
|---|---|---|---|
| 2004/0129478 A1* | 7/2004 | Breed | B60N 2/0276 180/273 |
| 2005/0046584 A1* | 3/2005 | Breed | B60N 2/0232 340/13.31 |
| 2006/0208169 A1* | 9/2006 | Breed | G06K 9/00624 250/221 |
| 2009/0092284 A1* | 4/2009 | Breed | B60N 2/002 382/103 |
| 2021/0178989 A1* | 6/2021 | Yoo | B60N 2/0224 |

FOREIGN PATENT DOCUMENTS

KR 2014-0028255 A 3/2014

* cited by examiner

*Primary Examiner* — Mark R Wendell
(74) *Attorney, Agent, or Firm* — Mintz Levin Cohn Ferris Glovksy and Popeo, P.C.; Peter F. Corless

(57) ABSTRACT

Disclosed are a system and method for controlling an air ventilation volume of a vehicle seat in which sweat generation rates, relative humidities, etc. of respective body parts of a passenger sitting on the vehicle seat are predicted in advance and an air ventilation volume is concentratedly distributed to a passenger's body part predicted to have a high sweat generation rate and a high relative humidity among the passenger's body parts in advance so that ventilation of the seat is carried out before the passenger feels inconvenience due to the locally over-wet state of the passenger's body, thereby allowing the passenger to feel comfort in a sense of sitting on the vehicle seat all the time.

11 Claims, 7 Drawing Sheets

[FIG. 1]
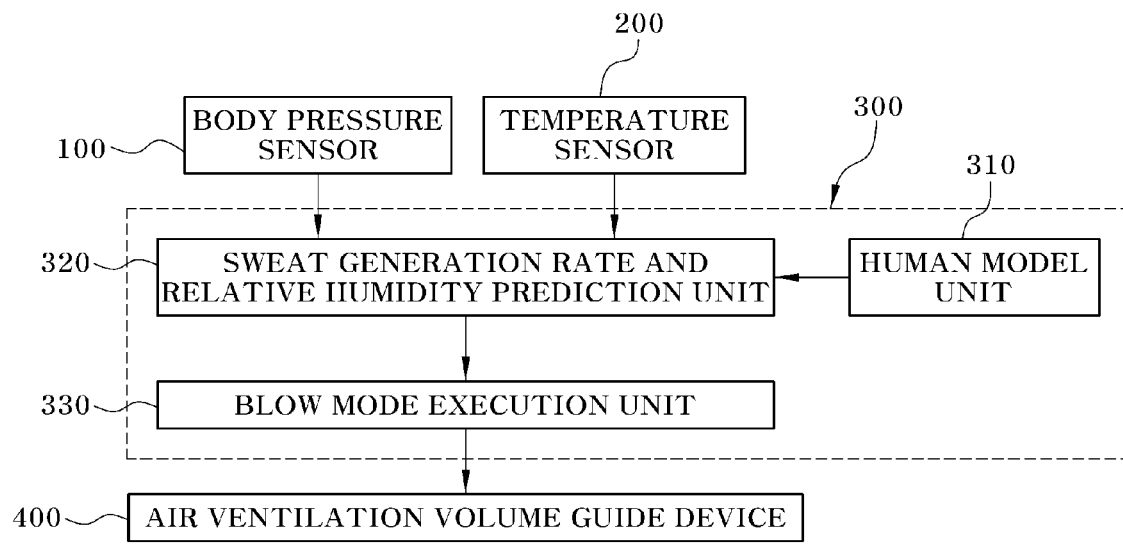
[FIG. 2]
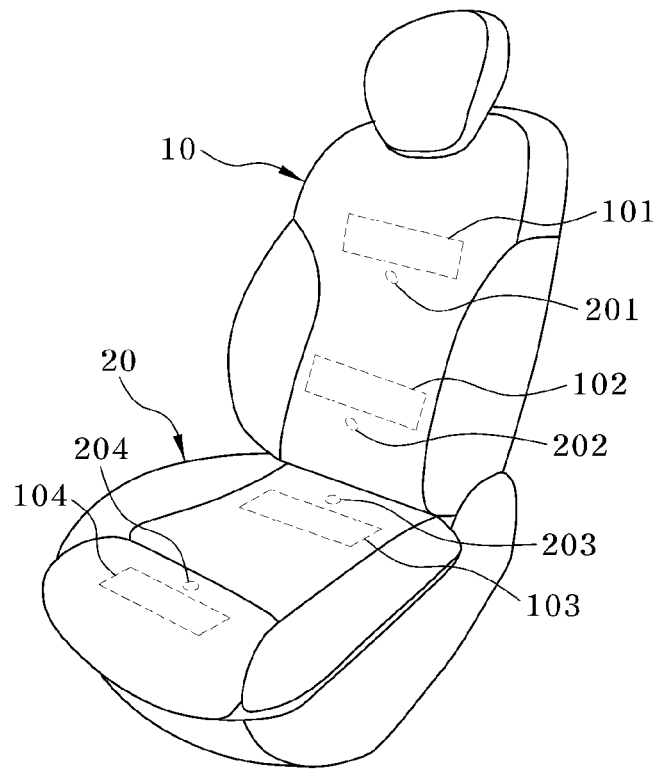

[FIG. 3]
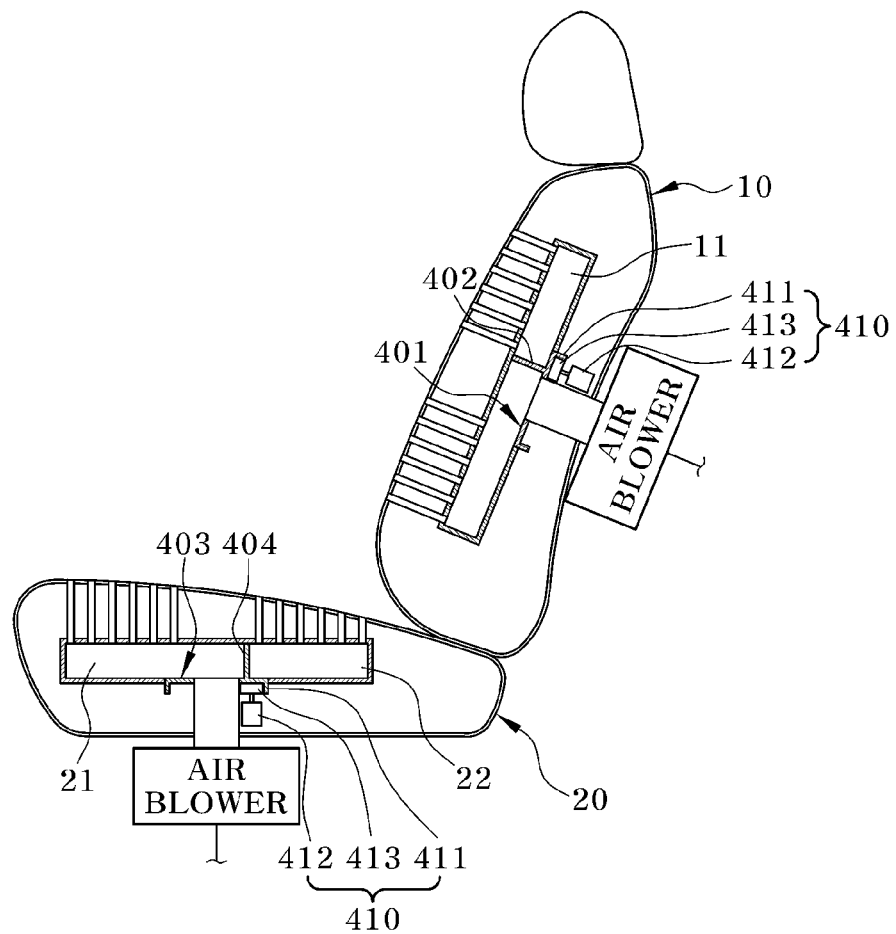

[FIG. 4]
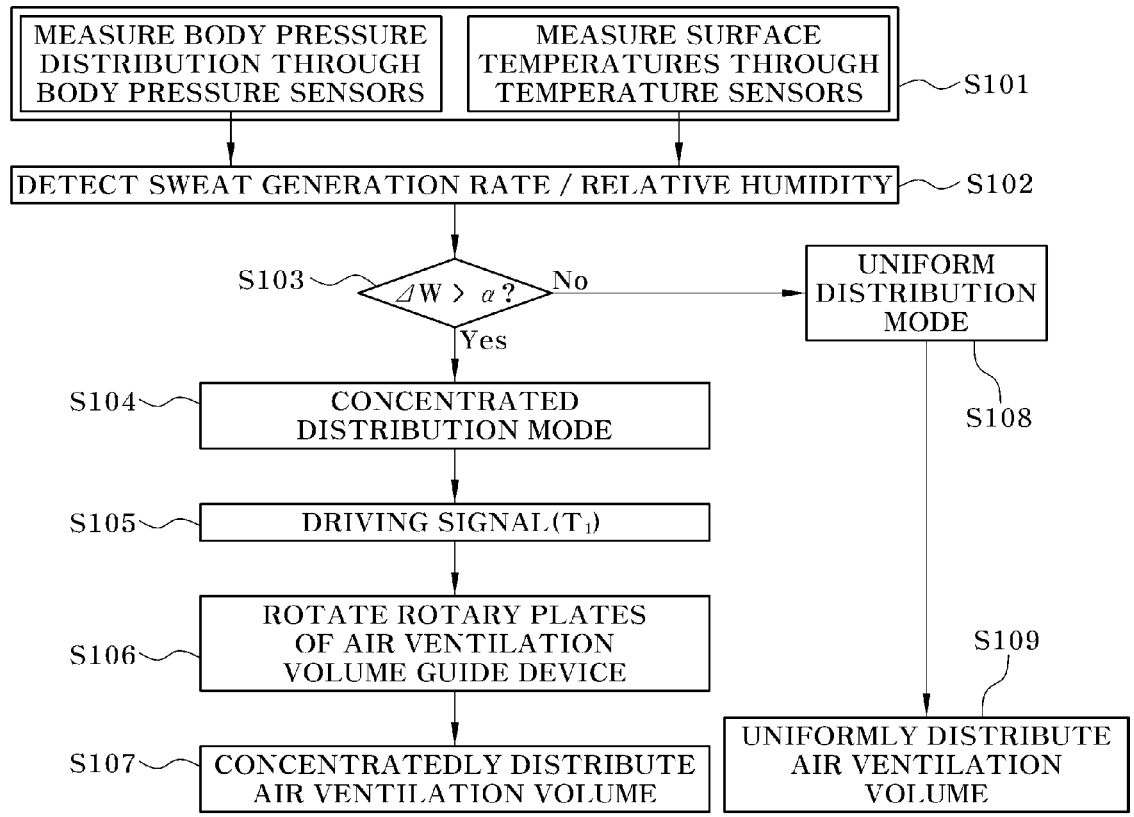

[FIG. 5]
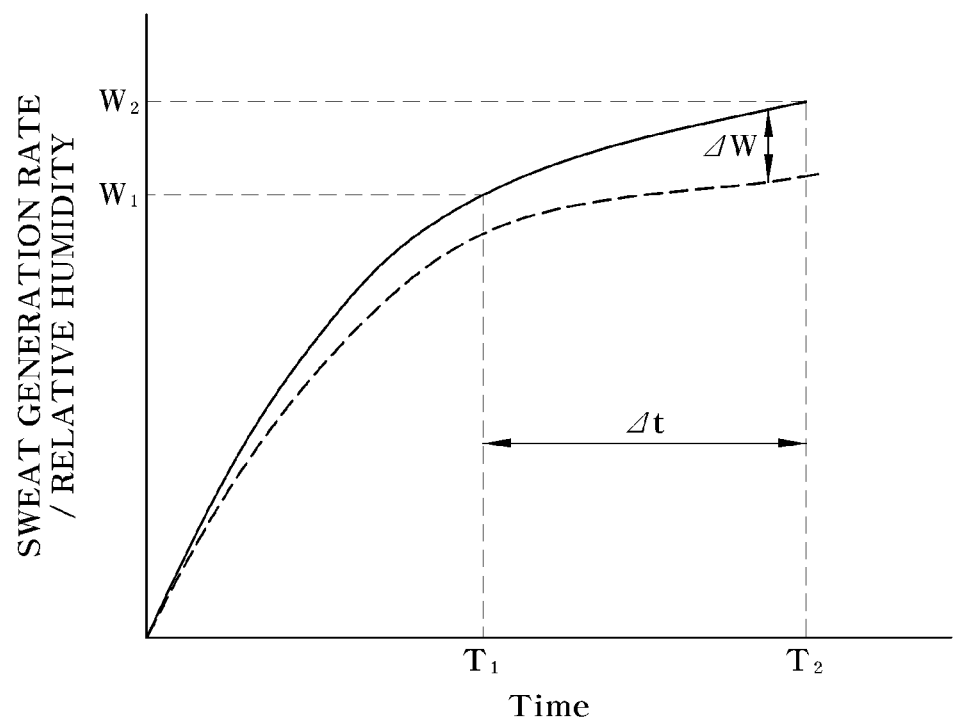

[FIG. 6]
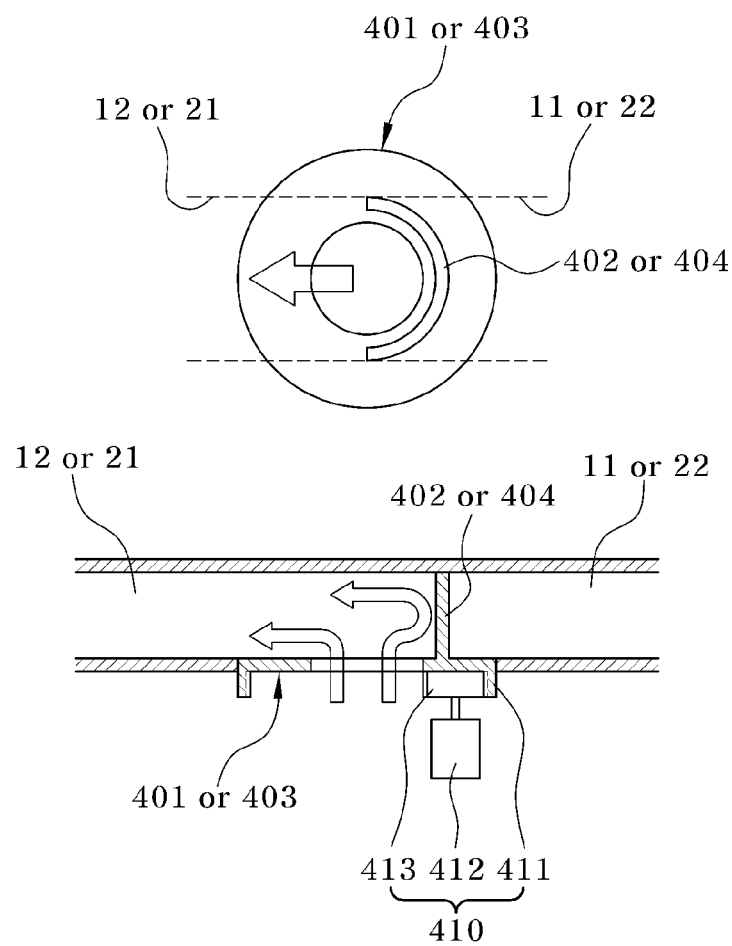

[FIG. 7]
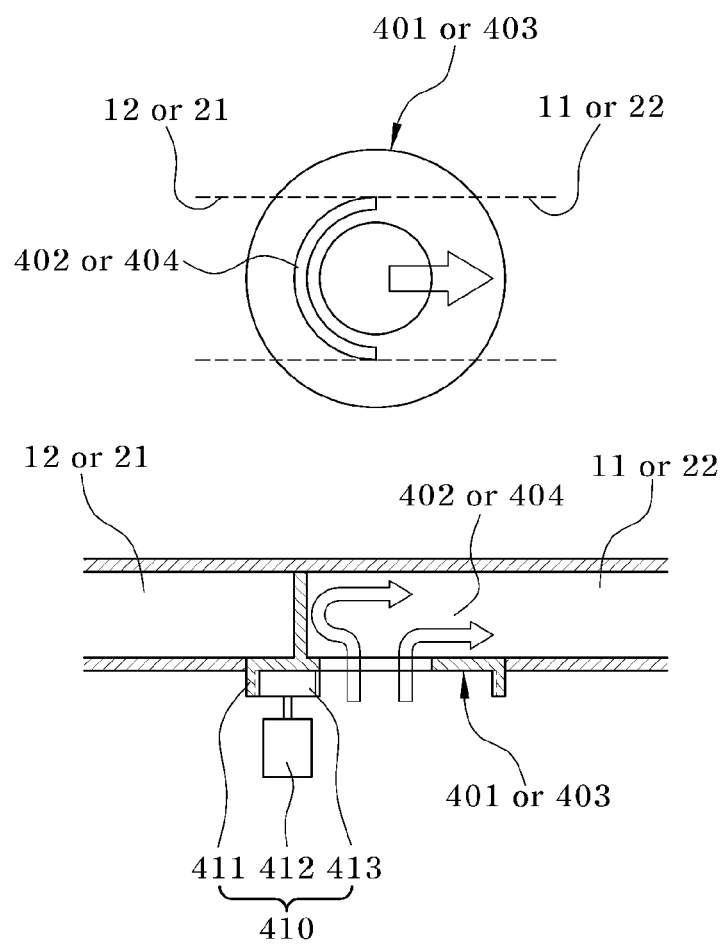

[FIG. 8]
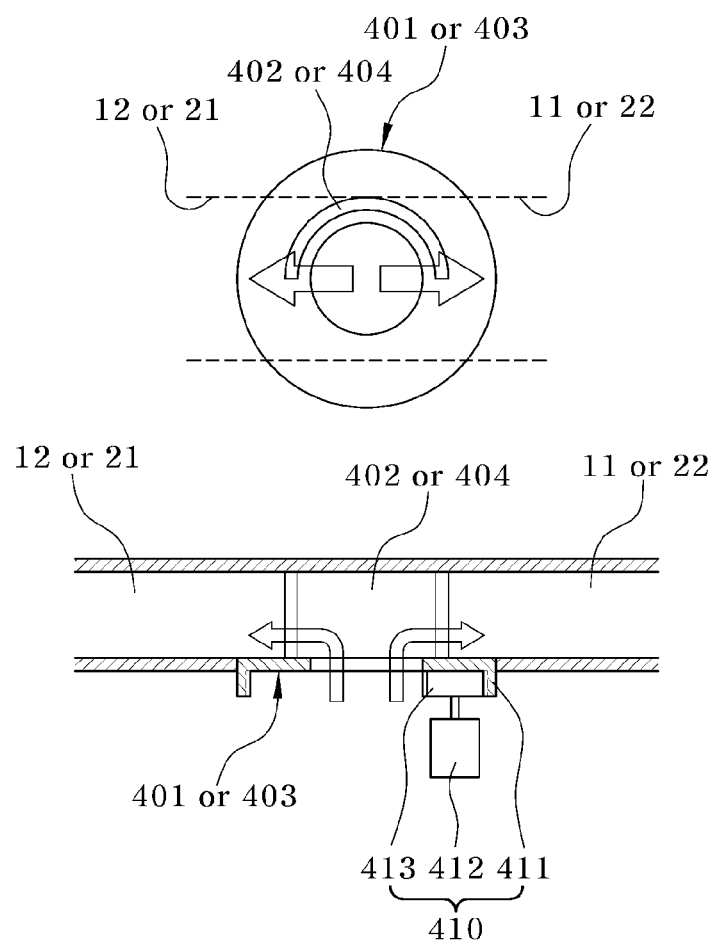

SYSTEM AND METHOD FOR CONTROLLING AIR VENTILATION VOLUME OF VEHICLE SEAT

CROSS-REFERENCE TO RELATED APPLICATION

This application claims under 35 U.S.C. § 119(a) the benefit of priority to Korean Patent Application No. 10-2020-0024714 filed on Feb. 28, 2020, the entire contents of which are incorporated herein by reference.

BACKGROUND

(a) Technical Field

The present disclosure relates to a system and method for controlling an air ventilation volume of a vehicle seat. More particularly, it relates to a system and method for controlling an air ventilation volume of a vehicle seat in which a passenger's sweating part is predicted in advance so that the air ventilation volume of the vehicle seat is concentrated on the predicted passenger's sweating part.

(b) Background Art

In general, when a passenger sits on a vehicle seat for a long time, a passenger's body part pressed against the seat is not smoothly ventilated, and thus, the passenger's body part pressed against the seat becomes wet with sweat, thereby causing passenger discomfort and inconvenience.

In order to solve such discomfort and inconvenience, a ventilation seat system, which discharges cool air to the surface of the seat via a duct from an air conditioning system of a vehicle so as to provide ride comfort to the passenger, is being used.

The conventional ventilation seat system uses an air ventilation control method which adjusts an air blowing volume through manual operation by a passenger, or an air ventilation control method which measures passenger's body temperature and humidity through a temperature sensor and a humidity sensor mounted in a seat and automatically increases an air blowing volume when the measured temperature and humidity are predetermined levels or more, and in this case, the same air ventilation volume is supplied to all body parts of the passenger without consideration of a humidity difference between the passenger's body parts of the passenger sitting on the vehicle seat and thus causes passenger inconvenience.

For example, an amount of sweat generated from the passenger's hips is great and relatively thus the temperature and relative humidity of the passenger's hips may be high, and an amount of sweat generated from the passenger's thighs is relatively small and thus the temperature and relative humidity of the passenger's thighs may be low.

In the above-described air ventilation control method which automatically increases the air blowing volume, the same air ventilation volume is supplied to all body parts of the passenger without consideration of a humidity difference between the passenger's body parts of the passenger sitting on the vehicle seat and thus causes passenger inconvenience.

Further, if the conventional ventilation seat system employs the air ventilation control method which automatically increases the air blowing volume, the air blowing amount to the surface of the seat is increased only when the passenger's body temperature and the passenger's sweat amount (humidity) have already reach predetermined levels, which cause displeasure, or more, and thus, passenger satisfaction with the ventilation seat is lowered.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art, and it is an object of the present invention to provide a system and method for controlling an air ventilation volume of a vehicle seat in which sweat generation rates, relative humidities, etc. of passenger's body parts of a passenger sitting on the vehicle seat are predicted in advance and an air ventilation volume is concentratedly distributed to a passenger's body part predicted to have a high sweat generation rate and a high relative humidity among the passenger's body parts in advance so that ventilation of the seat is carried out before the passenger feels inconvenience due to the locally over-wet state of the passenger's body, thereby allowing the passenger to feel comfort in a sense of sitting on the vehicle seat all the time.

In one aspect, the present invention provides a system for controlling an air ventilation volume of a vehicle seat, the system including a plurality of body pressure sensors mounted in a seat back and a seat cushion of the vehicle seat to measure a body pressure distribution of a passenger to portions of the seat back and the seat cushion contacting passenger's body parts, a plurality of temperature sensors mounted in the seat back and the seat cushion of the vehicle seat to sense seat surface temperatures of the portions of the seat back and the seat cushion contacting the passenger's body parts, a controller configured to predict an actual sweat generation rate or relative humidity difference between the passenger's body parts caused by the body pressure distribution of the passenger to the portions of the seat back and the seat cushion contacting the passenger's body parts, measured by the body pressure sensors, and the seat surface temperatures of the portions of the seat back and the seat cushion contacting the passenger's body parts, measured by the temperature sensors, and to execute a concentrated distribution mode executed so as to concentrate the air ventilation volume on a passenger's body part having a high sweat generation rate and relative humidity or to execute a uniform distribution mode executed so as to uniformly distribute the air ventilation volume to the passenger's body parts, and an air ventilation volume guide device rotatably mounted in the seat back and the seat cushion so as to concentratedly guide the air ventilation volume to the passenger's body part having the high sweat generation and high relative humidity or to uniformly distribute the air ventilation volume to the passenger's body parts in response to a driving command depending on execution of the concentrated distribution mode or the uniform distribution mode by the controller.

In a preferred embodiment, the controller may include a human model unit configured to construct reference data about a sweat generation rate or relative humidity difference between passenger's body parts, which is changed for a predetermined time based on a passenger body pressure distribution and seat surface temperatures, through experiments, a sweat generation rate and relative humidity prediction unit configured to detect the actual sweat generation rate or relative humidity difference between the passenger's body parts corresponding to the actual body pressure distribution of the passenger to the portions of the seat back and the seat cushion contacting the passenger's body parts, measured by the body pressure sensors, and the actual seat surface temperatures of the portions of the seat back and the seat cushion contacting the passenger's body parts, measured by the temperature sensors, from the reference data of the human model unit, and a blow mode execution unit configured to execute the concentrated distribution mode executed so as to concentrate the air ventilation volume on the passenger's body part having the high sweat generation and high relative humidity when the detected actual sweat generation rate or relative humidity difference between the passenger's body parts is greater than a reference value, or to execute the uniform distribution mode executed so as to uniformly distribute the air ventilation volume to the passenger's body parts when the detected actual sweat generation rate or relative humidity difference between the passenger's body parts is not greater than the reference value.

In another preferred embodiment, the air ventilation volume guide device may include a first rotary plate rotatably mounted at a boundary between an upper flow path, formed in a pad of the seat back to guide the air ventilation volume to a portion of the seat back contacting a passenger's back, and a lower flow path, formed in the pad of the seat back to guide the air ventilation volume to a portion of the seat back contacting a passenger's waist, a first blocking plate formed integrally with one side of a front surface of the first rotary plate to close one of the upper flow path and the lower flow path or to simultaneously open both the upper flow path and the lower flow path depending on a rotating angle of the first rotary plate, a second rotary plate rotatably mounted at a boundary between a front flow path, formed in a pad of the seat cushion to guide the air ventilation volume to a portion of the seat cushion contacting passenger's thighs, and a rear flow path, formed in the pad of the seat cushion to guide the air ventilation volume to a portion of the seat cushion contacting passenger's hips, a second blocking plate formed integrally with one side of an upper surface of the second rotary plate to close one of the front flow path and the rear flow path or to simultaneously open both the front flow path and the rear flow path depending on a rotating angle of the second rotary plate, and drive devices configured to rotate the first rotary plate and the second rotary plate in response to a control signal from the controller.

In still another preferred embodiment, each of the drive devices may include a ring gear mounted at a circumference of a rear surface of a corresponding one of the first rotary plate and the second rotary plate, a motor mounted on a seat frame, and a spur gear mounted at an output shaft of the motor so as to be engaged with the ring gear.

In yet another preferred embodiment, the body pressure sensors may include a first body pressure sensor mounted in a portion of the seat back contacting a passenger's back, a second body pressure sensor mounted in a portion of the seat back contacting a passenger's waist, a third body pressure sensor mounted in a portion of the seat cushion contacting passenger's hips, and a fourth body pressure sensor mounted in a portion of the seat cushion contacting passenger's thighs.

In still yet another preferred embodiment, the temperature sensors may include a first temperature sensor configured to measure a surface temperature of a portion of the seat back contacting a passenger's back, a second temperature sensor configured to measure a surface temperature of a portion of the seat back contacting a passenger's waist, a third temperature sensor configured to measure a surface temperature of a portion of the seat cushion contacting passenger's hips, and a fourth temperature sensor configured to measure a surface temperature of a portion of the seat cushion contacting passenger's thighs.

In another aspect, the present invention provides a method for controlling an air ventilation volume of a vehicle seat, the method including measuring, by a plurality of body pressure sensors mounted in a seat back and a seat cushion of the vehicle seat, a body pressure distribution of a passenger to portions of the seat back and the seat cushion contacting passenger's body parts, measuring, by a plurality of temperature sensors mounted in the seat back and the seat cushion of the vehicle seat, seat surface temperatures of the portions of the seat back and the seat cushion contacting the passenger's body parts, detecting, by a controller, an actual sweat generation rate or relative humidity difference between the passenger's body parts corresponding to the actual body pressure distribution to the portions of the seat back and the seat cushion contacting the passenger's body parts, measured by the body pressure sensors, and the actual seat surface temperatures of the portions of the seat back and the seat cushion contacting the passenger's body parts, measured by the temperature sensors, using a human model unit configured to construct reference data about a sweat generation rate or relative humidity difference between passenger's body parts, which is changed for a predetermined time based on a passenger body pressure distribution and seat surface temperatures, through experiments, executing, by the controller, a concentrated distribution mode executed so as to concentrate the air ventilation volume on a passenger's body part having a high sweat generation rate and a high relative humidity when the detected actual sweat generation rate or relative humidity difference between the passenger's body parts is greater than a reference value, and executing, by the controller, a uniform distribution mode executed so as to uniformly distribute the air ventilation volume to the passenger's body parts when the detected actual sweat generation rate or relative humidity difference between the passenger's body parts is not greater than the reference value.

In a preferred embodiment, a first rotary plate and a second rotary plate of the air ventilation volume guide device rotatably mounted in pads of the seat back and the seat cushion may be rotated so as to concentratedly guide the air ventilation volume to the passenger's body part having the high sweat generation and high relative humidity in response to a driving command depending on execution of the concentrated distribution mode by the controller.

In another preferred embodiment, a first blocking plate formed on the first rotary plate may block one of an upper flow path, formed in the pad of the seat back to guide the air ventilation volume to a portion of the seat back contacting a passenger's back, and a lower flow path, formed in the pad of the seat back to guide the air ventilation volume to a portion of the seat back contacting a passenger's waist, and a second blocking plate formed on the second rotary plate may block one of a front flow path, formed in the pad of the seat cushion to guide the air ventilation volume to a portion of the seat cushion contacting passenger's thighs, and a rear flow path, formed in the pad of the seat cushion to guide the air ventilation volume to a portion of the seat cushion contacting passenger's hips.

In still another preferred embodiment, a first rotary plate and a second rotary plate of the air ventilation volume guide device rotatably mounted in pads of the seat back and the seat cushion may be rotated so as to uniformly distribute the air ventilation volume to the passenger's body parts in response to a driving command depending on execution of the uniform distribution mode by the controller.

In yet another preferred embodiment, a first blocking plate formed on the first rotary plate may simultaneously open both an upper flow path, formed in the pad of the seat back to guide the air ventilation volume to a portion of the seat back contacting a passenger's back, and a lower flow path, formed in the pad of the seat back to guide the air ventilation volume to a portion of the seat back contacting a passenger's waist, and a second blocking plate formed on the second rotary plate may simultaneously open both a front flow path, formed in the pad of the seat cushion to guide the air ventilation volume to a portion of the seat cushion contacting passenger's thighs, and a rear flow path, formed in the pad of the seat cushion to guide the air ventilation volume to a portion of the seat cushion contacting passenger's hips.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 1 is a block diagram illustrating a system for controlling an air ventilation volume of a vehicle seat according to the present invention;

FIG. 2 is a schematic view illustrating mounting positions of body pressure sensors and temperature sensors among elements of the system according to the present invention;

FIG. 3 is a cross-sectional view illustrating one embodiment of an air ventilation volume guide device among the elements of the system according to the present invention;

FIG. 4 is a flowchart illustrating a method for controlling an air ventilation volume of a vehicle seat according to the present invention;

FIG. 5 is a graph showing a change in a sweat generation rate or relative humidity difference in the method according to the present invention;

FIGS. 6 and 7 are schematic views illustrating a state in which the air ventilation volume guide device shown in FIG. 4 is rotated to block one side of a ventilation flow path in response to a driving command depending on execution of a concentrated distribution mode by a controller; and FIG. 8 is a schematic view illustrating a state in which the air ventilation volume guide device shown in FIG. 4 is rotated to open both sides of the ventilation flow path in response to a driving command depending on execution of a uniform distribution mode by the controller.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawings.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a block diagram illustrating a system for controlling an air ventilation volume of a vehicle seat according to the present invention, FIG. 2 is a schematic view illustrating mounting positions of body pressure sensors and temperature sensors among elements of the system according to the present invention, and FIG. 3 is a cross-sectional view illustrating one embodiment of an air ventilation volume guide device among the elements of the system according to the present invention.

As shown in FIG. 2, a plurality of body pressure sensors 100 which measures a body pressure distribution of a passenger is mounted in each of a seat back 10 and a seat cushion 20 of a vehicle seat, and a plurality of temperature sensors 200 which senses seat surface temperatures is mounted in each of the seat back 10 and the seat cushion 20 of the vehicle seat.

Particularly, the body pressure sensors 100 include a first body pressure sensor 101 mounted in a portion of the seat back 10 contacting the passenger's back, a second body pressure sensor 102 mounted in a portion of the seat back 10 contacting the passenger's waist, a third body pressure sensor 103 mounted in a portion of the seat cushion 20 contacting the passenger's hips, and a fourth body pressure sensor 104 mounted in a portion of the seat cushion 20 contacting the passenger's thighs.

Accordingly, in a state in which the passenger sits on the vehicle seat, the first body pressure sensor 101 measures the body pressure of the passenger applied to the portion of the seat back 10 contacting the passenger's back and transmits the measured body pressure to a controller 300, the second body pressure sensor 102 measures the body pressure of the passenger applied to the portion of the seat back 10 contacting the passenger's waist and transmits the measured body pressure to the controller 300, the third body pressure sensor 103 measures the body pressure of the passenger applied to the portion of the seat cushion 20 contacting the passenger's hips and transmits the measured body pressure to the controller 300, and the fourth body pressure sensor 104 measures the body pressure of the passenger applied to the portion of the seat cushion 20 contacting the passenger's thighs and transmits the measured body pressure to the controller 300.

Further, the temperature sensors 200 include a first temperature sensor 201 which measures the surface temperature of the portion of the seat back 10 contacting the passenger's back and transmits the measured surface temperature to the controller 300 in the state in which the passenger sits on the vehicle seat, a second temperature sensor 202 which measures the surface temperature of the portion of the seat back 10 contacting the passenger's waist and transmits the measured surface temperature to the controller 300, a third temperature sensor 203 which measures the surface temperature of the portion of the seat cushion 20 contacting the passenger's hips and transmits the measured surface temperature to the controller 300, and a fourth temperature sensor 204 which measures the surface temperature of the portion of the seat cushion 20 contacting the passenger's thighs and transmits the measured surface temperature to the controller 300.

The controller 300 is configured to detect sweat generation rates and relative humidities of the passenger's body parts based on sensing signals from the first to fourth body pressure sensors 101, 102, 103 and 104 and sensing signals from the first to fourth temperature sensors 201, 202, 203 and 204, and then to execute a concentrated distribution mode in which the air ventilation volume is concentrated on a passenger's body part having a high sweat generation rate and a high relative humidity or a uniform distribution mode in which the air ventilation volume is uniformly distributed to the respective passenger's body parts.

That is, the controller 300 is configured to predict an actual sweat generation rate or relative humidity difference between the passenger's body parts which may be caused by the actual body pressure distribution to the portions of the seat back 10 and the seat cushion 20 contacting the passenger's body parts which is measured by the first to fourth body pressure sensors 101, 102, 103 and 104 and the actual seat surface temperatures of the portions of the seat back 10 and the seat cushion 20 contacting the passenger's body parts which are measured by the first to fourth temperature sensors 201, 202, 203 and 204, and to execute the concentrated distribution mode in which the air ventilation volume is concentrated on the passenger's body part having the high sweat generation and high relative humidity or the uniform distribution mode in which the air ventilation volume is uniformly distributed to the respective passenger's body parts.

For this purpose, the controller 300 may include a human model unit 310, a sweat generation rate and relative humidity prediction unit 320, and a blow mode execution unit 330.

The human model unit 310 is a kind of storage medium in which reference data about a sweat generation rate or relative humidity difference between passenger's body parts, which is changed for a predetermined time based on a passenger body pressure distribution to the portions of the seat back 10 and the seat cushion 20 contacting the passenger's body parts and seat surface temperatures of the portions of the seat back 10 and the seat cushion 20 contacting the passenger's body parts, is constructed through repetitive experiments, and is stored in the controller 300.

The sweat generation rate and relative humidity prediction unit 320 serves to execute a detection logic, and detects an actual sweat generation rate or relative humidity difference between the passenger's body parts corresponding to the actual body pressure distribution to the portions of the seat back 10 and the seat cushion 20 contacting the passenger's body parts which is measured by the first to fourth body pressure sensors 101, 102, 103 and 104 and the actual seat surface temperatures of the portions of the seat back 10 and the seat cushion 20 contacting the passenger's body parts which are measured by the first to fourth temperature sensors 201, 202, 203 and 204 from the above-described reference data of the human model unit 310 constructed through the repetitive experiments.

The blow mode execution unit 330 is configured to control the flow directions of the air ventilation volume supplied to the portions of the vehicle seat contacting the passenger's body parts (for example, the top of the back and/or the waist, and the hips and/or the thighs) based on a result of detection by the sweat generation rate and relative humidity prediction unit 320.

That is, the blow mode execution unit 330 executes the concentrated distribution mode in which the air ventilation volume is concentrated on the passenger's body part having the high sweat generation and high relative humidity, when the sweat generation rate or relative humidity difference between the passenger's body parts detected by the sweat generation rate and relative humidity prediction unit 320 is greater than a reference value, or executes the uniform distribution mode in which the air ventilation volume is uniformly distributed to the passenger's body parts, when the sweat generation rate or relative humidity difference between the passenger's body parts detected by the sweat generation rate and relative humidity prediction unit 320 is not greater than the reference value.

The system according to the present invention includes an air ventilation volume guide device 400 which concentratedly guides the air ventilation volume on the passenger's body part having the high sweat generation and high relative humidity or uniformly distributes the air ventilation volume to the passenger's body parts in response to a driving command signal from the blow mode execution unit 330 of the controller 300.

That is, the air ventilation volume guide device 400 is rotatably installed in the seat back 10 and the seat cushion 20, and is configured to concentrate the air ventilation volume on the passenger's body part having the high sweat generation and high relative humidity or uniformly distribute the air ventilation volume to the passenger's body parts in response to the driving command signal depending on execution of the concentrated distribution mode or the uniform distribution mode by the blow mode execution unit 330 of the controller 300.

For this purpose, the air ventilation volume guide device 400 includes, as shown in FIG. 3, a first rotary plate 401 which is rotatably mounted at the boundary between an upper flow path 11, formed in a pad of the seat back 10 to guide the air ventilation volume to the portion of the seat back 10 contacting the passenger's back, and a lower flow path 12, formed in the pad of the seat back 10 to guide the air ventilation volume to the portion of the seat back 10 contacting the passenger's waist, a first blocking plate 402 which is formed integrally with one side of the front surface of the first rotary plate 402 to close one of the upper flow path 11 and the lower flow path 12 or to simultaneously open both the upper flow path 11 and the lower flow path 12 depending on the rotating angle of the first rotary plate 401, and a drive device 410 which rotates the first rotary plate 401 in response to the driving command signal depending on execution of the concentrated distribution mode or the uniform distribution mode by the blow mode execution unit 330 of the controller 300.

Particularly, the drive device 410 for rotating the first rotary plate 401 may include a ring gear 411 mounted at the circumference of the rear surface of the first rotary plate 401, a motor 412 mounted on a seat frame, and a spur gear 413 mounted at an output shaft of the motor 412 so as to be engaged with the ring gear 411.

Further, the air ventilation volume guide device 400 includes, as shown in FIG. 3, a second rotary plate 403 which is rotatably mounted at the boundary between a front flow path 21, formed in a pad of the seat cushion 20 to guide the air ventilation volume to the portion of the seat cushion 20 contacting the passenger's thighs, and a rear flow path 22, formed in the pad of the seat cushion 20 to guide the air ventilation volume to the portion of the seat cushion 20 contacting the passenger's hips, a second blocking plate 404 which is formed integrally with one side of the upper surface of the second rotary plate 403 to close one of the front flow path 21 and the rear flow path 22 or to simultaneously open both the front flow path 21 and the rear flow path 22 depending on the rotating angle of the second rotary plate 403, and a drive device 410 which rotates the second rotary plate 403 in response to the driving command signal depending on execution of the concentrated distribution mode or the uniform distribution mode by the blow mode execution unit 330 of the controller 300.

In the same manner, the drive device 410 for rotating the second rotary plate 403 may include a ring gear 411 mounted at the circumference of the rear surface of the second rotary plate 403, a motor 412 mounted on the seat frame, and a spur gear 413 mounted at an output shaft of the motor 412 so as to be engaged with the ring gear 411.

Hereinafter, a method for controlling an air ventilation volume of a vehicle seat using the system including the above-described elements according to the present invention will be described.

FIG. 4 is a flowchart illustrating a method for controlling an air ventilation volume of a vehicle seat according to the present invention, and FIG. 5 is a graph showing a sweat generation rate or relative humidity difference between passenger's body parts.

First, in a state in which a passenger sits on the vehicle seat, a plurality of body pressure sensors and a plurality of temperature sensors mounted in the seat back 10 and the seat cushion 20 of the vehicle seat measure a body pressure distribution of the passenger to portions of the seat back 10 and the seat cushion 20 contacting respective passenger's body parts and seat surface temperatures of the portions of the seat back 10 and the seat cushion 20 contacting the passenger's body parts (S101).

That is, in the state in which the passenger sits on the vehicle seat, the first body pressure sensor 101 measures the body pressure of the passenger applied to the portion of the seat back 10 contacting the passenger's back and transmits the measured body pressure to the controller 300, the second body pressure sensor 102 measures the body pressure of the passenger applied to the portion of the seat back 10 contacting the passenger's waist and transmits the measured body pressure to the controller 300, the third body pressure sensor 103 measures the body pressure of the passenger applied to the portion of the seat cushion 20 contacting the passenger's hips and transmits the measured body pressure to the controller 300, and the fourth body pressure sensor 104 measures the body pressure of the passenger applied to the portion of the seat cushion 20 contacting the passenger's thighs and transmits the measured body pressure to the controller 300.

Further, in the state in which the passenger sits on the vehicle seat, the first temperature sensor 201 measures the surface temperature of the portion of the seat back 10 contacting the passenger's back and transmits the measured surface temperature to the controller 300, the second temperature sensor 202 measures the surface temperature of the portion of the seat back 10 contacting the passenger's waist and transmits the measured surface temperature to the controller 300, the third temperature sensor 203 measures the surface temperature of the portion of the seat cushion 20 contacting the passenger's hips and transmits the measured surface temperature to the controller 300, and the fourth temperature sensor 204 measures the surface temperature of portion of the seat cushion 20 contacting the passenger's thighs and transmits the measured surface temperature to the controller 300.

Thereafter, the sweat generation rate and relative humidity prediction unit 320 of the controller 300 detects an actual sweat generation rate or relative humidity difference $\Delta W$ between the passenger's body parts corresponding to the actual body pressure distribution to the portions of the seat back 10 and the seat cushion 20 contacting the passenger's body parts, which is measured by the body pressure sensors 101, 102, 103 and 104, and the actual seat surface temperatures of the portions of the seat back 10 and the seat cushion 20 contacting the passenger's body parts, which are measured by the temperature sensors 201, 202, 203 and 204, using the human model unit 310 in which reference data about a sweat generation rate or relative humidity difference between passenger's body parts, which is changed for a predetermined time based on the body pressure distribution of a passenger to the portions of the seat back 10 and the seat cushion 20 contacting the passenger's body parts and seat surface temperatures of the portions of the seat back 10 and the seat cushion 20 contacting the passenger's body parts, is constructed through repetitive experiments (S102).

That is, the sweat generation rate and relative humidity prediction unit 320 of the controller 300 detects the actual sweat generation rate or relative humidity difference $\Delta W$ between the passenger's body parts from the reference data in the human model unit 310 by comparing measured data received from the body pressure sensors 101, 102, 103 and 104 and the temperature sensors 201, 202, 203 and 204 with the reference data in the human model unit 310 (S102).

In more detail, the sweat generation rate and relative humidity prediction unit 320 determines whether or not the actual body pressure distribution to the portions of the seat back 10 and the seat cushion 20 contacting the passenger's body parts, which is measured by the body pressure sensors 101, 102, 103 and 104, and the actual seat surface temperatures of the portions of the seat back 10 and the seat cushion 20 contacting the passenger's body parts, which are measured by the temperature sensors 201, 202, 203 and 204, coincide with a body pressure distribution and seat surface temperatures included in the reference data in the human model unit 310, and determines a sweat generation rate or relative humidity difference at the body pressure distribution and the seat surface temperatures included in the reference data in the human model unit 310 as the actual sweat generation rate or relative humidity difference $\Delta W$ between the passenger's body parts.

Here, the sweat generation rate or relative humidity difference between the passenger's body parts may be understood as a sweat generation rate or relative humidity difference between the hips and the thighs of the passenger sitting on the vehicle seat or a sweat generation rate or relative humidity difference between the top of the back and the waist of the passenger sitting on the vehicle seat.

Thereafter, the blow mode execution unit 330 of the controller 300 compares the sweat generation rate or relative humidity difference between the passenger's body parts detected in Operation S102 with a reference value (S103).

As a result of the comparison, the blow mode execution unit 330 of the controller 300 executes the concentrated distribution mode in which the air ventilation volume is concentrated on the passenger's body part having a high sweat generation rate and a high relative humidity, when the sweat generation rate or relative humidity difference between the passenger's body parts is greater than the reference value (S104).

Subsequently, a driving command signal depending on execution of the concentrated distribution mode by the controller 300 is applied to the drive devices 410 of the air ventilation volume guide device 400 (S105).

That is, the first rotary plate 401 and the second rotary plate 402 of the air ventilation volume guide device 400 are rotated so as to concentrate the air ventilation volume on the passenger's body part having the high sweat generation and high relative humidity (S106).

In more detail, the motors 412 of the drive devices 410 are driven and simultaneously the spur gears 413 are rotated and thus transmit rotating force thereof to the ring gears 411, and due to rotation of the ring gears 411, the first rotary plate 401 and the second rotary plate 402 are rotated.

Therefore, the air ventilation volume may be concentrated on the passenger's body part having the high sweat generation and high relative humidity (S107).

For example, when the sweat generation rate and the relative humidity of the passenger's waist are greater than the sweat generation rate and the relative humidity of the top of the passenger's back, the air ventilation volume may be concentrated on the passenger's waist, and when the sweat generation rate and the relative humidity of the passenger's thighs are greater than the sweat generation rate and the relative humidity of the passenger's hips, the air ventilation volume may be concentrated on the passenger's thighs.

For this purpose, as shown in FIG. 6, the first rotary plate 401 is rotated and simultaneously the first blocking plate 402 is rotated at the same angle as the first rotary plate 401 so as to block the upper flow path 11 of the pad of the seat back 10 and to open the lower flow path 11 of the pad of the seat back 10, and the second rotary plate 403 is rotated and simultaneously the second blocking plate 404 is rotated at the same angle as the second rotary plate 403 so as to block the rear flow path 22 of the pad of the seat cushion 20 and to open the front flow path 21 of the pad of the seat cushion 20.

Thereby, air for ventilation supplied from an air blower may be concentratedly supplied to be distributed to the passenger's waist through the lower flow path 12, and the air for ventilation supplied from another air blower may be concentratedly supplied to be distributed to the passenger's thighs through the front flow path 21.

On the other hand, when the sweat generation rate and the relative humidity of the top of the passenger's back are greater than the sweat generation rate and the relative humidity of the passenger's waist, the air ventilation volume may be concentrated on the top of the passenger's waist, and when the sweat generation rate and the relative humidity of the passenger's hips are greater than the sweat generation rate and the relative humidity of the passenger's thighs, the air ventilation volume may be concentrated on the passenger's hips.

For this purpose, as shown in FIG. 7, the first rotary plate 401 is rotated and simultaneously the first blocking plate 402 is rotated at the same angle as the first rotary plate 401 so as to block the lower flow path 12 of the pad of the seat back 10 and to open the upper flow path 11 of the pad of the seat back 10, and the second rotary plate 403 is rotated and simultaneously the second blocking plate 404 is rotated at the same angle as the second rotary plate 403 so as to block the front flow path 21 of the pad of the seat cushion 20 and to open the rear flow path 22 of the pad of the seat cushion 20.

Thereby, air for ventilation supplied from the air blower may be concentratedly supplied to be distributed to the top of the passenger's back through the upper flow path 11, and the air for ventilation supplied from the air blower may be concentratedly supplied to be distributed to the passenger's hips through the rear flow path 22.

As such, when the sweat generation rate or relative humidity difference $\Delta W$ between the passenger's body parts, for example, the sweat generation rate or relative humidity difference $\Delta W$ between the top of the passenger's back and the passenger's waist or the sweat generation rate or relative humidity difference $\Delta W$ between the passenger's hips and the passenger's thighs, is greater than the reference value, the air ventilation volume is concentrated on the passenger's body having the high sweat generation and high relative humidity in advance, thereby being capable of resolving the locally over-wet state of the passenger's body and thus providing comfort in a sense of sitting on the vehicle seat to the passenger.

Particularly, as shown in FIG. 5, the process for comparing the sweat generation rate or relative humidity difference $\Delta W$ between the passenger's body parts with the reference value is carried out at a point in time T1 prior to a point in time T2 when the sweat generation rate or relative humidity difference $\Delta W$ becomes the maximum, and thus, when the sweat generation rate or relative humidity difference $\Delta W$ between the passenger's body parts is greater than the reference value, the air ventilation volume is concentrated on the passenger's body part having a high sweat generation rate and a high relative humidity in advance at the point in time T1 prior to the point in time T2 when the sweat generation rate or relative humidity difference $\Delta W$ becomes the maximum, thereby being capable of resolving the locally over-wet state of the passenger's body and thus providing comfort in a sense of sitting on the vehicle seat to the passenger.

On the other hand, as the result of the comparison in Operation 103, the blow mode execution unit 330 of the controller 300 executes the uniform distribution mode in which the air ventilation volume is uniformly distributed to the passenger's body parts, when the sweat generation rate or relative humidity difference $\Delta W$ between the passenger's body parts is not greater than the reference value (S108).

Subsequently, a driving command signal depending on execution of the uniform distribution mode by the controller 300 is applied to the drive devices 410 of the air ventilation volume guide device 400, and the first rotary plate 401 and the second rotary plate 402 are rotated at an angle at which the air ventilation volume is uniformly distributed to the passenger's body parts, thereby allowing air supplied from the air blowers to be uniformly distributed to the passenger's body parts (S109).

For this purpose, as shown in FIG. 8, the first rotary plate 401 is rotated and the first blocking plate 402 is moved to a position to simultaneously open both the upper flow path 11 to guide the air ventilation volume to the portion of the seat back 10 contacting the passenger's back and the lower flow path 12 to guide the air ventilation volume to the portion of the seat back 10 contacting the passenger's waist, and the second rotary plate 403 is rotated and the second blocking plate 404 is moved to a position to open both the front flow path 21 to guide the air ventilation volume to the portion of the seat cushion 20 contacting the passenger's thighs and the rear flow path 22 to guide the air ventilation volume to the portion of the seat cushion 20 contacting the passenger's hips.

Therefore, air supplied from the air blowers may be uniformly distributed to the top of the passenger's back and the passenger's waist through the upper flow path 11 and the lower flow path 12, and be uniformly distributed to the passenger's thighs and hips through the front flow path 21 and the rear flow path 22.

As is apparent from the above description, a system and method for controlling an air ventilation volume of a vehicle seat according to the present invention provide the following effects.

First, sweat generation rates, relative humidities, etc. of body parts of a passenger sitting on the vehicle seat are predicted in advance, and an air ventilation volume is intensively distributed in advance to a passenger's body part predicted to have a high sweat generation rate and a high relative humidity among the passenger's body parts, thereby being capable of resolving a locally over-wet state of the passenger's body parts and thus providing comfort in a sense of sitting on the vehicle seat to the passenger.

Second, air ventilation is carried out before the passenger feels inconvenience due to the locally over-wet state of the passenger's body, thereby allowing the passenger to feel comfort in a sense of sitting on the vehicle seat all the time.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for controlling an air ventilation volume of a vehicle seat, the system comprising:
    a plurality of body pressure sensors mounted in a seat back and a seat cushion of the vehicle seat to measure a body pressure distribution of a passenger to portions of the seat back and the seat cushion contacting passenger's body parts;
    a plurality of temperature sensors mounted in the seat back and the seat cushion of the vehicle seat to sense seat surface temperatures of the portions of the seat back and the seat cushion contacting the passenger's body parts;
    a controller configured to predict an actual sweat generation rate or relative humidity difference between the passenger's body parts caused by the body pressure distribution of the passenger to the portions of the seat back and the seat cushion contacting the passenger's body parts, measured by the body pressure sensors, and the seat surface temperatures of the portions of the seat back and the seat cushion contacting the passenger's body parts, measured by the temperature sensors, and to execute a concentrated distribution mode executed so as to concentrate the air ventilation volume on a passenger's body part having a high sweat generation rate and relative humidity or to execute a uniform distribution mode executed so as to uniformly distribute the air ventilation volume to the passenger's body parts; and
    an air ventilation volume guide device rotatably mounted in the seat back and the seat cushion so as to concentratedly guide the air ventilation volume to the passenger's body part having the high sweat generation and high relative humidity or to uniformly distribute the air ventilation volume to the passenger's body parts in response to a driving command depending on execution of the concentrated distribution mode or the uniform distribution mode by the controller.

2. The system of claim 1, wherein the controller comprises:
    a human model unit configured to construct reference data about a sweat generation rate or relative humidity difference between passenger's body parts, which is changed for a predetermined time based on a passenger body pressure distribution and seat surface temperatures, through experiments;
    a sweat generation rate and relative humidity prediction unit configured to detect the actual sweat generation rate or relative humidity difference between the passenger's body parts corresponding to the actual body pressure distribution of the passenger to the portions of the seat back and the seat cushion contacting the passenger's body parts, measured by the body pressure sensors, and the actual seat surface temperatures of the portions of the seat back and the seat cushion contacting the passenger's body parts, measured by the temperature sensors, from the reference data of the human model unit; and
    a blow mode execution unit configured to execute the concentrated distribution mode executed so as to concentrate the air ventilation volume on the passenger's body part having the high sweat generation and high relative humidity when the detected actual sweat generation rate or relative humidity difference between the passenger's body parts is greater than a reference value, or to execute the uniform distribution mode executed so as to uniformly distribute the air ventilation volume to the passenger's body parts when the detected actual sweat generation rate or relative humidity difference between the passenger's body parts is not greater than the reference value.

3. The system of claim 1, wherein the air ventilation volume guide device comprises:
    a first rotary plate rotatably mounted at a boundary between an upper flow path, formed in a pad of the seat back to guide the air ventilation volume to a portion of the seat back contacting a passenger's back, and a lower flow path, formed in the pad of the seat back to guide the air ventilation volume to a portion of the seat back contacting a passenger's waist;
    a first blocking plate formed integrally with one side of a front surface of the first rotary plate to close one of the upper flow path and the lower flow path or to simultaneously open both the upper flow path and the lower flow path depending on a rotating angle of the first rotary plate;
    a second rotary plate rotatably mounted at a boundary between a front flow path, formed in a pad of the seat cushion to guide the air ventilation volume to a portion of the seat cushion contacting passenger's thighs, and a rear flow path, formed in the pad of the seat cushion to guide the air ventilation volume to a portion of the seat cushion contacting passenger's hips;
    a second blocking plate formed integrally with one side of an upper surface of the second rotary plate to close one of the front flow path and the rear flow path or to simultaneously open both the front flow path and the rear flow path depending on a rotating angle of the second rotary plate; and
    drive devices configured to rotate the first rotary plate and the second rotary plate in response to a control signal from the controller.

4. The system of claim 3, wherein each of the drive devices comprises:
    a ring gear mounted at a circumference of a rear surface of a corresponding one of the first rotary plate and the second rotary plate;

a motor mounted on a seat frame; and
a spur gear mounted at an output shaft of the motor so as to be engaged with the ring gear.

5. The system of claim 1, wherein the body pressure sensors comprise:
a first body pressure sensor mounted in a portion of the seat back contacting a passenger's back;
a second body pressure sensor mounted in a portion of the seat back contacting a passenger's waist;
a third body pressure sensor mounted in a portion of the seat cushion contacting passenger's hips; and
a fourth body pressure sensor mounted in a portion of the seat cushion contacting passenger's thighs.

6. The system of claim 1, wherein the temperature sensors comprise:
a first temperature sensor configured to measure a surface temperature of a portion of the seat back contacting a passenger's back;
a second temperature sensor configured to measure a surface temperature of a portion of the seat back contacting a passenger's waist;
a third temperature sensor configured to measure a surface temperature of a portion of the seat cushion contacting passenger's hips; and
a fourth temperature sensor configured to measure a surface temperature of a portion of the seat cushion contacting passenger's thighs.

7. A method for controlling an air ventilation volume of a vehicle seat, the method comprising:
measuring, by a plurality of body pressure sensors mounted in a seat back and a seat cushion of the vehicle seat, a body pressure distribution of a passenger to portions of the seat back and the seat cushion contacting passenger's body parts;
measuring, by a plurality of temperature sensors mounted in the seat back and the seat cushion of the vehicle seat, seat surface temperatures of the portions of the seat back and the seat cushion contacting the passenger's body parts;
detecting, by a controller, an actual sweat generation rate or relative humidity difference between the passenger's body parts corresponding to the actual body pressure distribution to the portions of the seat back and the seat cushion contacting the passenger's body parts, measured by the body pressure sensors, and the actual seat surface temperatures of the portions of the seat back and the seat cushion contacting the passenger's body parts, measured by the temperature sensors, using a human model unit configured to construct reference data about a sweat generation rate or relative humidity difference between passenger's body parts, which is changed for a predetermined time based on a passenger body pressure distribution and seat surface temperatures, through experiments;
executing, by the controller, a concentrated distribution mode executed so as to concentrate the air ventilation volume on a passenger's body part having a high sweat generation rate and a high relative humidity when the detected actual sweat generation rate or relative humidity difference between the passenger's body parts is greater than a reference value; and
executing, by the controller, a uniform distribution mode executed so as to uniformly distribute the air ventilation volume to the passenger's body parts when the detected actual sweat generation rate or relative humidity difference between the passenger's body parts is not greater than the reference value.

8. The method of claim 7, wherein a first rotary plate and a second rotary plate of the air ventilation volume guide device rotatably mounted in pads of the seat back and the seat cushion are rotated so as to concentratedly guide the air ventilation volume to the passenger's body part having the high sweat generation and high relative humidity in response to a driving command depending on execution of the concentrated distribution mode by the controller.

9. The method of claim 8, wherein a first blocking plate formed on the first rotary plate blocks one of an upper flow path, formed in the pad of the seat back to guide the air ventilation volume to a portion of the seat back contacting a passenger's back, and a lower flow path, formed in the pad of the seat back to guide the air ventilation volume to a portion of the seat back contacting a passenger's waist, and a second blocking plate formed on the second rotary plate blocks one of a front flow path, formed in the pad of the seat cushion to guide the air ventilation volume to a portion of the seat cushion contacting passenger's thighs, and a rear flow path, formed in the pad of the seat cushion to guide the air ventilation volume to a portion of the seat cushion contacting passenger's hips.

10. The method of claim 7, wherein a first rotary plate and a second rotary plate of the air ventilation volume guide device rotatably mounted in pads of the seat back and the seat cushion are rotated so as to uniformly distribute the air ventilation volume to the passenger's body parts in response to a driving command depending on execution of the uniform distribution mode by the controller.

11. The method of claim 10, wherein a first blocking plate formed on the first rotary plate simultaneously opens both an upper flow path, formed in the pad of the seat back to guide the air ventilation volume to a portion of the seat back contacting a passenger's back, and a lower flow path, formed in the pad of the seat back to guide the air ventilation volume to a portion of the seat back contacting a passenger's waist, and a second blocking plate formed on the second rotary plate simultaneously opens both a front flow path, formed in the pad of the seat cushion to guide the air ventilation volume to a portion of the seat cushion contacting passenger's thighs, and a rear flow path, formed in the pad of the seat cushion to guide the air ventilation volume to a portion of the seat cushion contacting passenger's hips.

* * * * *